US011157261B2

(12) United States Patent
Berra et al.

(10) Patent No.: US 11,157,261 B2
(45) Date of Patent: Oct. 26, 2021

(54) METHOD OF EVALUATING A SOFTWARE UPGRADE OF A WIND TURBINE

(71) Applicant: VESTAS WIND SYSTEMS A/S, Aarhus N (DK)

(72) Inventors: Asier Berra, Åarhus C (DK); Kresten Bertelsen, Åbyhøj (DK); Carsten Krough Nielsen, Hammel (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/651,414

(22) PCT Filed: Sep. 3, 2018

(86) PCT No.: PCT/DK2018/050218
§ 371 (c)(1),
(2) Date: Mar. 27, 2020

(87) PCT Pub. No.: WO2019/063050
PCT Pub. Date: Apr. 4, 2019

(65) Prior Publication Data
US 2020/0293300 A1  Sep. 17, 2020

(30) Foreign Application Priority Data
Sep. 27, 2017 (DK) .............................. PA201770730

(51) Int. Cl.
*G06F 8/65* (2018.01)
*H02J 3/00* (2006.01)
*F03D 7/04* (2006.01)

(52) U.S. Cl.
CPC ............... *G06F 8/65* (2013.01); *F03D 7/048* (2013.01); *H02J 3/003* (2020.01); *H02J 2300/28* (2020.01)

(58) Field of Classification Search
CPC ......... G06F 8/65; H02J 3/003; H02J 2300/28; F03D 7/048
See application file for complete search history.

(56) References Cited

U.S. PATENT DOCUMENTS 7,403,854 B1* 7/2008 Hurley ................... G06Q 50/06
702/3
2007/0299548 A1  12/2007 Weitkamp
(Continued)

FOREIGN PATENT DOCUMENTS

CN  102003341 A   4/2011
CN  102208050 A   10/2011
(Continued)

OTHER PUBLICATIONS

Danish Patent and Trademark Office 1st technical examination for application PA 2017 70730 dated Feb. 16, 2018.
(Continued)

*Primary Examiner* — S. Sough
*Assistant Examiner* — Stephen D Berman
(74) *Attorney, Agent, or Firm* — Patterson + Sheridan, LLP

(57) ABSTRACT

A method of estimating a parameter relating to an upgrade of a wind turbine software includes toggling the wind turbine alternatingly between two modes, where the upgrade is implemented in one but not the other. Data is collected during toggling and divided into pairs of data parts, one from each mode. The data from the two modes is ordered separately and a quantile-to-quantile comparison is made.

19 Claims, 1 Drawing Sheet

(56) References Cited

U.S. PATENT DOCUMENTS

| | | | |
|---|---|---|---|
| 2010/0076614 A1 | 3/2010 | Nies et al. | |
| 2015/0292486 A1* | 10/2015 | Zhou | F03D 80/40 702/35 |
| 2016/0265513 A1 | 9/2016 | Evans et al. | |
| 2016/0333854 A1 | 11/2016 | Lund et al. | |
| 2018/0363632 A1* | 12/2018 | Wheeler | F03D 7/043 |

FOREIGN PATENT DOCUMENTS

| | | |
|---|---|---|
| EP | 2679813 A1 | 1/2014 |
| EP | 2647838 B1 | 12/2014 |
| EP | 3012449 A1 | 4/2016 |
| WO | 2016186694 A1 | 11/2016 |
| WO | 2019063050 A1 | 4/2019 |

OTHER PUBLICATIONS

Written Opinion of the International Searching Authority for Application PCT/DK2018/050218 dated Feb. 16, 2018.
National Intellectual Property Administration (CNIPA) of the People's Republic of China Notification of the First Office Action for Application No. 201880063014.4 dated Feb. 1, 2021.

* cited by examiner

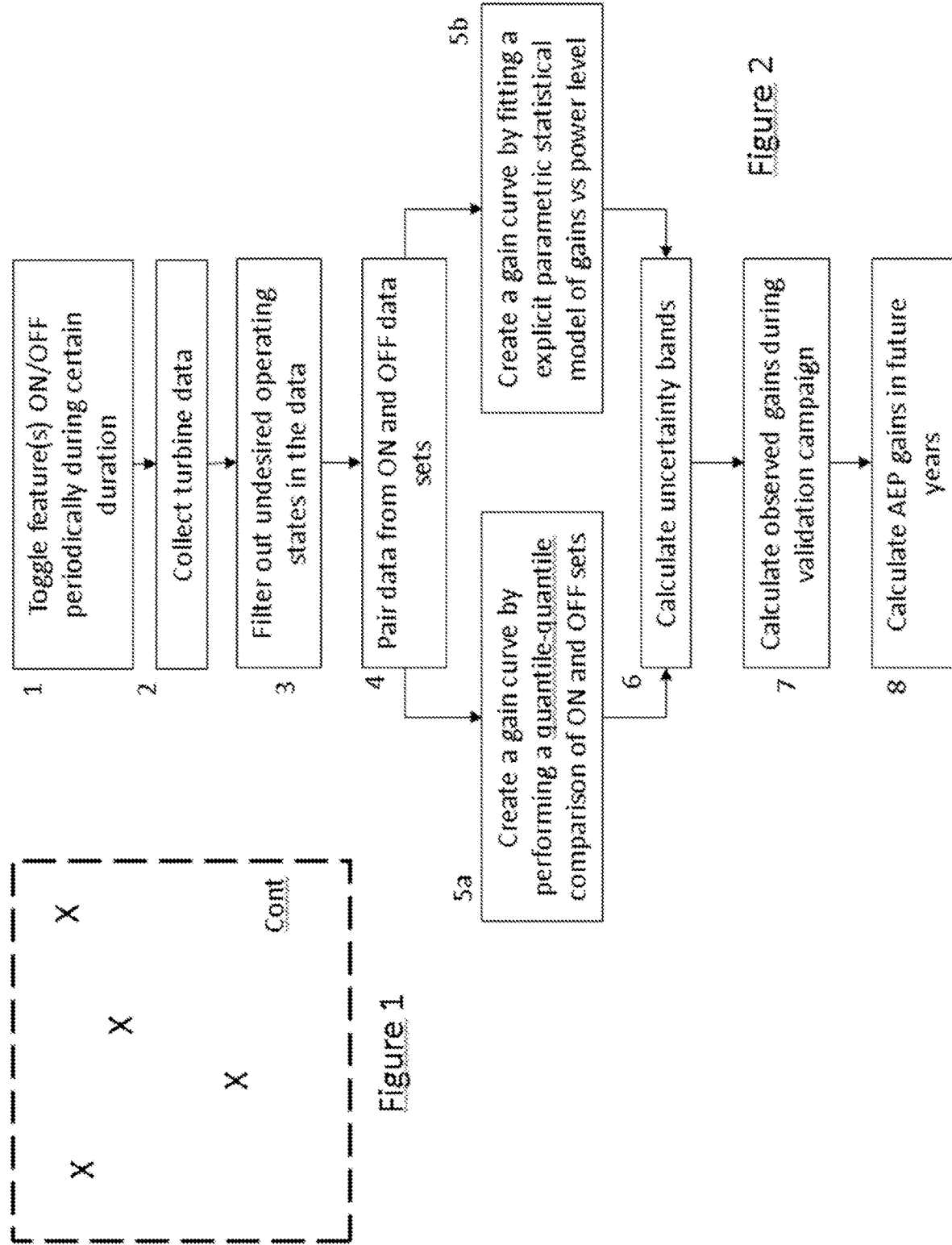

METHOD OF EVALUATING A SOFTWARE UPGRADE OF A WIND TURBINE

FIELD OF THE INVENTION

The present invention relates to a method of evaluating a software upgrade of a wind turbine, a wind turbine capable of this evaluation and a data carrier with instructions suitable for the evaluation.

BACKGROUND OF THE INVENTION

After wind turbines are erected and have begun operation, it is possible to modify them in ways that will improve their individual performance or the performance of a collection of turbines (a wind farm). Such modifications may be add-ons on the blades or new or improved equipment, but also software changes, such as improved logic, improved parameters, coordinated logic, or the leak. We speak of "new features" to refer to such kind of improvements. One or several features can be installed at once at a given turbine or park.

The gained energy production (in annual terms) that each individual new feature yields is typically small, in the order for example of ~0.5%. Standard methods for assessing turbine performance and power gains are based on meteorological mast anemometry measurements or nacelle anemometry measurements, but in practice, they are not accurate enough as to allow concluding with high confidence whether a gain has actually occurred or not.

Validation methods may be seen in US2016/0265513, WO2017/088877, WO2017/088878, and WO2017/088879.

OBJECT OF THE INVENTION

It is an object of embodiments of the invention to provide greater accuracy than standard methods, with the purpose of concluding with a high certainty whether a gain has actually occurred or not. Additionally, they also aim at reducing validation campaign time.

SUMMARY OF THE INVENTION

A first aspect the present invention relates to a method of estimating a parameter relating to an upgrade of a wind turbine software, the method comprising:
  toggling the wind turbine alternatingly between two modes:
    a first mode where the upgrade is not implemented and
    a second mode where the upgrade is implemented
  during toggling, collecting data relating to a performance of the wind turbine,
  deriving pairs of data parts, where a first part of a pair corresponds to the data collected during the first mode and derived during one period of time and a second part of the pair corresponds to the data collected during the second mode and collected through a second period of time, and
  estimating the parameter from the pairs of data parts, the estimating step comprising:
    ordering the first parts in relation to the data parts thereof,
    ordering the second parts in relation to the data parts thereof and
    comparing the data part of a first part at a first position in the ordered first parts and the data part of a second part at the first position in the ordered second parts.

In the present context, an upgrade of a wind turbine is a change of a parameter influencing the operation of the wind turbine. Preferably, the upgrade is a change of software run on or hardware used by the processor affecting the operation of the wind turbine. The processor may be a part of the wind turbine or be positioned off-site, such as in another wind turbine, in a wind turbine farm processor, or in e.g. a server farm or the like. The processor is preferably able to influence the operation of the wind turbine by affecting the manner in which the hardware of the wind turbine (such as the nacelle, the blades, the gear box, the converter and the like) operate in a given situation.

Usually, it is desired to determine whether the processor is able to, with the upgrade, affect the wind turbine to perform better, such as to generate more power, generate less noise, generate less turbulence, or the like.

Toggling the wind turbine between the two modes is a shifting of the software, such as a portion of the software, controlling the wind turbine and run on one or more processors. This may be done in real time without having to stop the wind turbine between operating modes. The first mode thus is a mode wherein the upgrade is not implemented, such as the historical manner of operation of the wind turbine. In the second mode, the upgrade is implemented and the wind turbine thus operated in a different manner.

Usually, the only difference made between the two modes is the implementation or not of the upgrade such that the data obtained during the two modes may be compared.

Naturally, three or more modes may be defined and toggled between, such as if multiple different software upgrades are to be evaluated individually or combined.

During toggling, i.e. during the periods of time where the first and second modes, respectfully, are operating, data is collected relating to a performance of the wind turbine. As the software upgrade may have many purposes and many resulting effects, the data collected may be selected according to the upgrade. If the upgrade targets noise reduction, the data collected may be noise data, for example. Often, upgrades target increased power generation by the wind turbine, so the data may relate to the power generated. Naturally, the data may relate to multiple effects, such as both noise and power generation, as the power generated is always of interest and as undesired or unexpected side effects may be obtained (such as noise, turbulence or the like) which are preferably detected and taken in account when determining whether the upgrade is desired or not.

From the data derived, pairs of data parts are identified. A data part relates to the data collected during operation in one of the modes. A data part may relate to a combined power generated during the operation of the mode, such as the full period of time of operating in that mode between operations in the other mode. In some situations, it is desired to discard a portion of such data, such as the first data after toggling from the other mode, to ensure that the wind turbine is in a steady state before collecting the data. Thus, it may be desired to discard data from a first proportion of the time of operating in the mode, such as the first 5%, such as the first 10%, such as the first 15%, 20%, or 25% of the time. The discarding of undesired data need not relate to the period of time of operating the wind turbine in the mode, so the discarding may be a discarding of data within the first 2 minutes, such as within the first 4 minutes, such as the first 5, 8, 10 or 15 minutes of operating the wind turbine in the mode.

A pair of data parts thus has a data part collected during operation in the first mode and a data part collected during operation in the second mode. Below, a number of advantages will be described which stem from pairs of data being used in the analysis.

A number of manners exist of generating the pairs of one data part from the first mode and one data part from the second mode. It may be desired to generate the pairs with data parts stemming from the first and second modes, respectively, operating under otherwise similar conditions, such as the same wind speed, wind direction, temperature, humidity, precipitation, or the like. Different manners exist of arriving at pairs of data parts. One method would be to select data parts collected closely, in time, to each other, such as if it can be assumed that the conditions do not change a lot over a relatively short period of time.

In one situation, the deriving step comprises deriving pairs of data parts, where a first part of a pair corresponds to the data collected during the first mode and derived during one period of time and a second part of the pair corresponds to the data collected during the second mode and collected through a second period of time, where the first and second periods of time are no more than 3 hours apart. Preferably, the one period of time and the second period of time are adjacent to each other, so that, e.g. only a toggling from the one mode to the other mode takes place between the periods of time.

In other situations, additional parameters, such as temperature, wind speed, wind direction, humidity, temperature, precipitation or the like, may be determined during the operation in the modes and while collecting the data parts. Then, pairs of data parts may be generated by identifying, for a data part collected during the first mode, a data part collected during the second mode with the same or similar additional parameters. In this context, "similar" may be determined on the basis of the overall variation of the parameter(s) so that if a large variation exists, "similar" may allow a larger difference between the parameter(s) of a pair than if a lower variation exists in the data collected.

Data or data parts collected during one of the modes but which do not form part of a pair may be discarded. Such data may relate to unusual conditions, such as unusual operation of the wind turbine, such as if ice is present on the blades, the operation is de-rated or the like.

According to the first aspect, the parameter is estimated from the pairs by ordering the first parts in relation to the data parts thereof and ordering the second parts in relation to the data parts thereof and then comparing the data part of a first part at a first position in the ordered first parts and the data part of a second part at the first position in the ordered second parts.

The first and second parts relate to data parts collected during the operation. Thus, these data parts are quantities of whatever parameter is interesting in relation to the update. The ordering of the first parts in relation to the data parts thereof may comprise an ordering of the first parts in an increasing or decreasing order determined from a quantity of the data parts therein. In this situation, the orders of the data parts may result in a data part of one pair not having the same position, in the orders, as that of the other data part of the pair. However, when only pairs of data parts are used in the analysis, the orders have the same number of elements and the data parts at a given position of the two orders may be compared.

Thus, the data parts at a given, first, position in the orders may be compared, and the result of the comparison used in the estimation of the upgrade.

The first position may be a position between the lowest and highest positions of the order(s). The orders have as many positions as pairs of data parts are used. Thus, any number of data pairs may be used, such as at least 5, such as at least 10, 20, 25, 30, 35, 40, 45, 50, 75, 100, 200, 400, 500, 700, 1000 or more if desired. Then, the orders usually will have the same number of positions and the first position is one of these positions.

In one embodiment, the comparing step comprises comparing also the data part of a first part at a second position in the ordered first parts and the data part of a second part at the second position in the ordered second parts. Naturally, any number of the positions may be used in the comparison. Actually, all positions may be compared if desired.

As mentioned above, the improvements expected by an upgrade may be rather modest, so it may be desired to derive a measure of the uncertainty of the estimation. One manner of obtaining a measure of the uncertainty is to perform the same method but without toggling between two modes. Instead, the "toggling" is between the same mode (the first mode), so that pairs are again obtained, ordered etc.

Thus, the method may further comprise:
  operating the wind turbine in the first mode while collecting the data,
  deriving second pairs of data parts, where a first part of a second pair corresponds to the data collected during one period of time and a second part of the second pair corresponds to the data collected during a second period of time,
  ordering the first parts of the second pairs in relation to the data part thereof, and
  ordering the second parts of the second pairs in relation to the data part thereof,
  wherein the estimating step also comprises comparing the data part of a first part of the second pairs at the first position in the ordered first parts of the second pairs and the data part of a second part of the second pairs at the first position in the ordered second parts of the second pairs.

Thus, the data parts of the pairs now relate only to the first mode, and any variation between the two orders stem from not the upgrade but the operation of the wind turbine, such as varying wind speed/direction, precipitation, humidity, temperature and the like. Such variation is also expected when collecting the data during toggling between the first and second modes and therefore is a source of error now estimated by the operation only in the first mode. Naturally, this operation may be performed at any point in time, such as constantly or repeatedly. Thus, such data may be ready when an upgrade is obtained and desired tested.

A second aspect of the invention relates to a method of estimating a parameter relating to an upgrade of a wind turbine software, the method comprising:
  toggling the wind turbine alternatingly between two modes:
    a first mode where the upgrade is not implemented and
    a second mode where the upgrade is implemented,
  during toggling, collecting data relating to a performance of the wind turbine,
  deriving pairs of data parts, where a first part of a pair corresponds to the data collected during the first mode and derived during one period of time and a second part of the pair corresponds to the data collected during the second mode and collected through a second period of time, and
  estimating the parameter from the pairs of data parts, the estimating step comprising:
    determining, for each pair, a difference value of the first and second data parts of the pair, ordering the pairs in accordance with a value determined from the first and/or second parts of the pairs and fitting a curve to the difference values ordered according to the order.

The toggling, the modes and the deriving of the pairs may be as seen above in the first aspect of the invention.

Naturally, the first and second aspects may be combined by simply performing both the estimating step of the first aspect and that of the second aspect to further improve the method.

According to the second aspect of the invention, the estimating step comprises estimating the parameter from the pairs of data parts, the estimating step comprising:

determining, for each pair, a difference value of the first and second data parts of the pair, ordering the pairs in accordance with a value determined from the first and/or second parts of the pairs and fitting a curve to the difference values ordered according to the order.

Thus, another manner of utilizing the pairs of data parts is seen in which a difference value is determined for each pair. Usually, the data parts of a pair relates only to a single parameter, such as the power generated, whereby the difference value is the power generated represented by one of the data parts subtracted from that represented by the other data part. If a data part relates to multiple parameters, one of the parameters is selected for the subtraction and curve fitting.

The pairs are then ordered. The ordering may be according to a value of the first data part, a value of the second data part or a value determined from the two data parts, such as a mean value thereof.

The order may be represented as a graph or curve with the value along the X axis and the difference value along the Y axis.

A curve may be fitted to the ordered values, such as the graph or curve. Curve fitting often comprises selecting a curve type and a number of parameters or degrees of freedom thereof, where after a corresponding curve is fitted by determining the parameters of the curve fitting the curve to the ordered values. Often, the curve fitting is termed a parametric curve fitting, where a curve is selected having a number of parameters which are then obtained by fitting the curve to the graph or data. The parameters then describe the curve and may also be used in the estimation of whether the upgrade is suitable or not.

Also in this aspect, the uncertainty of the measurement or determination may be estimated. In this situation, the method may further comprise:

operating the wind turbine in the first mode while collecting data relating to a performance of the wind turbine, deriving second pairs of data parts, where a first part of a second pair corresponds to the data collected during the first mode and derived during one period of time and a second part of the second pair corresponds to the data collected during the first mode and collected through a second period of time, determining, for each second pair, a difference value of the first and second data parts of the second pair, ordering the second pairs in accordance with a value determined from the first and/or second parts of the second pairs and fitting a second curve to difference values ordered according to the of the second pairs.

wherein the estimating step is based also on the second curve.

Thus, the same method is performed without toggling to the second mode. Again, the result, now a fitted, second curve, will describe the uncertainty as it relates to variations in the data parts not stemming from the second mode.

Again, this process may be performed in advance of the testing of an upgrade and may be performed continuously or periodically.

In general, as mentioned above, the pairs of data parts may be identified in a number of manners. In one situation, the data parts are paired only if they are obtained within a maximum time difference from each other. In one situation, first and second periods of time of the data parts of each pair are adjacent to each other. Thus, only the toggling from one mode to the other exists between the time periods during which the data parts are collected. Other manners of determining the pairs are described further above. Above is also described that a portion of the data collected during a time period may be discarded if desired.

In general, the toggling step may comprise toggling at least 1 time every hour. As the toggling is between different software, the toggling may not require stopping of the wind turbine such that the toggling may be rather often. A high toggling frequency has the advantage that operation in both modes may be possible within a short period of time so that the external circumstances (wind speed/direction etc.) may be the same. In that manner, more suitable data may be arrived at.

Preferably, the toggling takes place 2 times or more each hour, such as 3 times or more each hour.

Even though any data or parameter may in principle be of interest, the most relevant parameter when determining the usefulness of a software upgrade is the power generated. Thus, the collecting step usually comprises collecting, as the data, a power production of the wind turbine.

In general, the overall result of the estimation may be a simple identification of that of the first and second modes which is desirable, such as provided the most power, the least noise or the like. The result may be represented as a mean, estimated additional power production or an estimated additional power production over a period of time, such as a year.

A third aspect of the invention relates to a wind turbine comprising a controller configured to:

toggle the wind turbine alternatingly between two modes: a first mode where the upgrade is not implemented and a second mode where the upgrade is implemented, during toggling, collect data relating to a performance of the wind turbine, derive pairs of data parts, where a first part of a pair corresponds to the data collected during one period of time and a second part of the pair corresponds to the data collected during a second period of time, and estimate the parameter from the pairs of data parts, the estimating step comprising:

ordering the first parts in relation to the data parts thereof, ordering the second parts in relation to the data parts thereof and comparing the data part of a first part at a first position in the ordered first parts and the data part of a second part at the first position in the ordered second parts.

It is seen that the processor is capable of performing the method according to the first aspect of the invention. Naturally, all the above considerations and embodiments are equally valid in relation to this aspect of the invention.

In this context, the wind turbine usually has a tower, a nacelle, a number of blades and elements for converting the rotation of the blades to power, such as a generator and a gearbox. In addition, pitch motors or actuators and controllers may be provided for rotating the blades to alter the pitch, and one or more motors or actuators may be provided for rotating the nacelle to direct the rotation axis of the blades into a wind direction. Additionally, different sensors may be provided for sensing the power generated, the wind direction, wind speed, humidity, temperature, precipitation, turbulence, noise, vibrations and the like.

The motors/actuators and sensors may be connected to the same processor or a number of processors which may but need not be provided in the actual wind turbine. The processor(s) may be positioned in a common structure for a number of wind turbines, such as for a wind turbine farm, or may be positioned off-site, such as in a server farm.

Usually, a wind turbine will report data, such as the above sensed data, at regular intervals. Naturally, if desired, the reporting may be in real time and constant, but that is usually not required.

Also, the software for the processor may be received from outside of the processor and thus outside of the wind turbine.

The processor is capable of performing the steps according to the first aspect of the invention. Thus, the processor is capable of toggling between the two modes (or more) as well as collecting the data during operation in the modes. The different modes may be characterized in altered operation of the motors/actuators, such as the pitch motors/actuators, so that different modes have different operation of the hardware of the wind turbine. Thus, the wind turbine should have means for controlling the hardware parameters which are to be altered between the two modes.

It is noted that the controller need not be a single controller. The controller may be distributed so that the operation, toggling and data collection takes place in a controller, such as a controller positioned in the wind turbine, whereas the deriving/estimating takes place on a separate controller, which may be remote from the wind turbine. Thus, data may be exchanged between the controllers. Also, the actual software update may be fed to the controller in the wind turbine from the remote controller.

Also, the remote controller may receive data from a plurality of wind turbines so as to receive more statistically reliable data. In this situation, the turbines may be operated in synchronism so that all are toggled to the first mode and the second mode at the same time. Alternatively, the turbines may be operated out of synch so that some may operate in the first mode while others operate in the second mode. Also, the periods of time of operating in the modes may differ from wind turbine to wind turbine if desired. Thus, if unexpected variations are seen in the wind or other conditions, these may be experienced by multiple wind turbines and perhaps some wind turbines operating in the first mode and others in the second mode.

Also, the impact on one wind turbine caused by another wind turbine being in the first or second mode may be determined if data from multiple wind turbines are obtained. This may be relevant if the modes affect e.g. the turbulence caused by the wind turbine.

A fourth aspect of the invention relates to a wind turbine comprising a controller configured to:
toggle the wind turbine alternatingly between two modes:
a first mode where the upgrade is not implemented and
a second mode where the upgrade is implemented,
during toggling, collect data relating to a performance of the wind turbine,
derive pairs of data parts, where a first part of a pair corresponds to the data collected during the first mode and derived during one period of time and a second part of the pair corresponds to the data collected during the second mode and collected through a second period of time, and
estimate the parameter from the pairs of data parts, the estimating step comprising:
determining, for each pair, a difference value of the first and second data parts of the pair,
ordering the pairs in accordance with a value determined from the first and/or second parts of the pairs and
fitting a curve to the difference values ordered according to the order.

Thus, the wind turbine controller is capable of performing the method of the second aspect of the invention. Naturally, all situations, embodiments and considerations mentioned above are equally relevant here. This includes that the processor may combine the estimating steps of the first and second aspects to improve the estimation of the upgrade.

Also, the above considerations of the wind turbine, elements, motors/actuators, sensors, controlling and the like described in relation to the third aspect are equally relevant for the fourth aspect of the invention.

As mentioned above, the first and second periods of time of the data parts of each pair are preferably not too far away from each other and are preferably adjacent to each other.

Also, preferably the controller is configured to toggle at least 1 times every hour, such as at least 2, 3, 4, 5 or more times every hour.

A fifth aspect of the invention relates to a data carrier comprising a set of instructions configured to control a controller of a wind turbine to:
toggle the wind turbine alternatingly between two modes:
a first mode where the upgrade is not implemented and
a second mode where the upgrade is implemented,
during toggling, collect data relating to a performance of the wind turbine,
derive pairs of data parts, where a first part of a pair corresponds to the data collected during one period of time and a second part of the pair corresponds to the data collected during a second period of time, and
estimate the parameter from the pairs of data parts, the estimating step comprising:
ordering the first parts in relation to the data parts thereof,
ordering the second parts in relation to the data parts thereof and
comparing the data part of a first part at a first position in the ordered first parts and the data part of a second part at the first position in the ordered second parts.

In this context, the instructions enable a processor, or a set of processors, to perform the method of the first aspect of the invention. Thus, the situations, embodiments and considerations mentioned in relation to the first and third aspects of the invention are equally valid here.

The instructions enable the controller(s) to control the wind turbine. Thus, the instructions may comprise statements controlling the controller to output instructions for the individual, controllable elements of the wind turbine. Naturally, wind turbines have different, controllable elements which may require different instructions to respond thereto. Thus, the instructions may be adapted to the particular wind turbine, or one or more adapters or interpreters (often called drivers) may be provided for preparing the instructions for the particular type of wind turbines.

In the same manner, different sensors may have different output which may need to be adapted to the signals expected by the processor(s). Thus, converters/interpreters/drivers may be provided for this conversion. This is standard electronics and signal adaptation.

As mentioned above, the processor may be a set of processors where one or more are provided in the wind turbine proper and other(s) outside of the wind turbine.

Naturally, as mentioned above, a processor may receive data from multiple wind turbines.

A final aspect of the invention relates to a data carrier comprising a set of instructions configured to control a controller of a wind turbine to:
- toggle the wind turbine alternatingly between two modes:
  - a first mode where the upgrade is not implemented and
  - a second mode where the upgrade is implemented,
- during toggling, collect data relating to a performance of the wind turbine,
- derive pairs of data parts, where a first part of a pair corresponds to the data collected during the first mode and derived during one period of time and a second part of the pair corresponds to the data collected during the second mode and collected through a second period of time, and
- estimate the parameter from the pairs of data parts, the estimating step comprising:
  - determining, for each pair, a difference value of the first and second data parts of the pair,
  - ordering the pairs in accordance with a value determined from the first and/or second parts of the pairs and
  - fitting a curve to the difference values ordered according to the order.

In this context, the instructions enable a processor, or a set of processors, to perform the method of the second aspect of the invention. Thus, the situations, embodiments and considerations mentioned in relation to the second and fourth aspects of the invention are equally valid here. Also, as mentioned above, the first and second aspects may be combined. Thus, the fifth and final aspects may be combined so that the estimation steps are combined.

Also, the considerations described in relation to the fifth aspect are equally valid in relation to the final aspect of the invention.

LEGENDS TO THE FIGURE

FIG. 1 illustrates a wind turbine farm with wind turbines and a farm controller

FIG. 2 is a flow chart of the preferred embodiment of the invention.

DETAILED DISCLOSURE OF THE INVENTION

In FIG. 1, a number of wind turbines, each represented by an "X", are illustrated, forming a wind turbine farm. A wind farm controller (Cont.) is illustrated. Each wind turbine usually has its own controller for controlling a number of parameters of the wind turbine and for collecting data, such as power generation, from the operation of the wind turbine. The collected data may be fed to the wind farm controller (or to another external unit) regularly or when unexpected parameters are detected. Also, instructions or altered configurations may be received from the wind farm controller or other, external sources.

A vast number of parameters may be altered in a wind turbine. Some parameters require bringing the wind turbine out of production, such as replacement or updating of the blades, gear box, or the like. Other updates may be made during operation of the wind turbine, such as updating of the software or instructions controlling the controller. Such updating may be to optimize the power generation of the wind turbine, reduce the noise generated, the turbulence generated or the like. However, as it is a software update of the controller of the wind turbine and not a replacement of hardware in the wind turbine, the update may be activated while the wind turbine is in operation. In fact, the wind turbine may be toggled between modes where the update is installed and where it is not, so that the performance of the wind turbine may be evaluated swiftly and without bringing it out of operation.

Even when the surrounding parameters (such as wind direction or wind speed or others) are not exactly constant between a period of time where the upgrade was active and a period of time where it was not, the fact that they are temporarily close means that they typically show high degree of autocorrelation, and thus the statistical characteristics of the measured magnitudes (such as power production) in those pair of observations will be rather similar and will allow for rather precise comparison between them.

Especially when the wind turbine is toggled in and out of the update with a high frequency, the performance of the upgrade of the wind turbine may be estimated rather precisely, as neighbouring data sets from a period of time where the upgrade was active and a period of time where it was not may indicate the performance of the upgrade, especially when other parameters, such as (average) wind direction, (average) wind speed and the like, may be assumed to not have changed during the two periods of time.

Collecting a number of such pairs of data from a wind turbine may then generate sufficient statistics to arrive at a suitable determination of the performance of the upgrade.

Naturally, the same operation may be performed in multiple wind turbines. The toggling of the wind turbines may be synchronized or not. Synchronized toggling may be to have all wind turbines operate with the upgrade at the same time to evaluate how the wind farm operates with the upgrade. This may be relevant when the upgrade has to do with e.g. turbulence generation.

Alternatively, the wind turbines may be operated out of synchronism so that different wind turbines operate with the upgrade operational and others not, such as when the toggling takes place at different point in time and/or when the toggling frequencies of the wind turbines differ. In that situation, the natural variability in the surrounding parameters (such as wind direction or wind speed, or others) between two periods of time may for example for some turbines coincide with the upgrade toggling from active to inactive, while for others may coincide with the upgrade toggling from inactive to active. This way the randomness of the surrounding parameters affects more evenly on the toggle event across the different turbines in the park, allowing for a more precise evaluation of the upgrade.

It may be desired to, when obtaining the data from the wind turbine, discard not only undesired data, such as data from a non-optimized operation of the wind turbine, but also data determined during the first fraction of the period of time of operating a mode. The first 2, 3, 5, 10 minutes, for example, of data may be discarded, as the wind turbine may be allowed to enter a steady state after toggling into the new or other mode.

Non-optimized operation of the wind turbine may be seen either if brought out of operation due to high winds or during abnormal operation, such as when de-rated, running in a noise reduction mode, load reduction mode, with ice on the blades, with a faulty component, or the like.

The determining of the data and the subsequent calculations on that data may be performed by the controller of the wind turbine or another controller, such as the farm controller or a central computer or data ware house. The calculations may be performed simultaneous to the toggling or subsequent thereto.

In FIG. 2, a flow diagram is illustrated of preferred manners of determining whether an upgrade is desired or not. As mentioned, the upgrade may be tested in a single wind turbine or a number of turbines and the toggling may be performed in synchronization or not.

The following method is described primarily as performed in a single wind turbine, but it may easily be scaled to multiple wind turbines—both when all wind turbines of a wind turbine park are taken together, and when the park is split into smaller groups of turbines, where the same method may be used on the wind turbines of each group. Also, when multiple wind turbines are operated and toggled out of synchronism, the same method may be used, where the fact that a turbine is in the upgraded mode and another is not may be taken into account.

In step 1, the upgrade software has been fed to the controller, and the wind turbine is now toggled by a mode where the upgrade is active and a mode where the wind turbine has not been upgraded. This toggling preferably takes place at least every hour, but each mode may be continuously operated only for a fraction of an hour, such as 50 minutes, 40 minutes, 30 minutes, 20 minutes or less.

In step 2, data is collected from the wind turbine. This data has to do with wind turbine performance and often is the power generated, such as generated active power, reactive power, blade pitch position, load measurements, component power consumption, nacelle alignment, measured wind speed, rotational speed and others.

This data may be the standard SCADA 10-min average values normally calculated and reported by wind turbines. The preferred measurement for this validation is the average active power production by the generator every 10 minutes, but other magnitudes could also be of interest.

Data is retrieved as said for both the ON and the OFF periods. The data may be collected in a centralized location (farm controller, data warehouse, files or the like), and may be processed offline after the campaign, to perform the validation analysis. Thus, there is no need to configure the turbine controller to perform special calculations.

For the turbine to be able to toggle, first the controller software has to have that capacity. Controller software upgrading is a normal procedure, which is carried out occasionally, with the customer's consent. Newer software versions usually bundle a bunch of improvements or bug fixes in each release, in order to provide more advanced capabilities or to correct previous mis-performance.

One such capability could be to introduce the toggling option of one or more parameters or features. The next step could be to configure the toggle option adequately (selection of concrete features to toggle, selection of toggling frequency, starting time etc.). Once the appropriate turbine controller version is in place and the configuration has been uploaded, at some point in time the controller is instructed to start toggling.

Toggling in this way does not disturb turbine operation, that is, power production is uninterrupted. It simply instructs the controller to utilize and alternative logic or alternative set of parameters during a given temporal window, so essentially the toggle modifies the numeric inputs and outputs that the controller generates internally, and that are used to take control actions on the components of the turbine. When the feature is toggled OFF, it carries on, just using the former logic/parameters.

During the toggling, data is derived from the wind turbine.

Then, pairs of data parts are formed in step 4. A data part relates to the performance of the wind turbine during a single operation in a mode and usually between two operations in the other mode. As described, the data may relate only to the operation during a portion of the period of time of operation in this mode.

A pair of data parts relate to two operations (one in each of the two modes) which are assumed to take place under similar circumstances. Preferably, the data parts relate to operations sequentially taking place so that they relate to adjacent time periods.

In another embodiment, the circumstances during the operation may be determined or logged, such as a wind speed, wind direction, temperature or the like, during the operation. Then, data parts may be paired which relate to the same circumstances, even though obtained during periods of time which are not adjacent to each other or even close to each other. It may be desired to log the data parts as well as the circumstance data and subsequently derive the pairs on the basis of the same or similar circumstance data.

In this context, circumstance data may also relate to the operation of other wind turbines or the like in the surroundings, as a mode change of a wind turbine may alter its turbulence characteristics which may affect the operation of a down-wind wind turbine.

Data parts not taking part in a pair of data parts may also be discarded.

A number of manners exist of estimating the upgrade from the pairs of data parts.

One desired outcome of the validation process is the so-called gain curve. The gain curve may describe what the power production gain is deemed to be at each power production level, or at each incoming wind speed level. For example, it could say that at a power production level of 1200 Kw, it is deemed that +25 Kw can be attributed to the new features.

One way to obtain the gain curve (step 5a) is by comparing the quantiles of both ON and OFF data subsets. Quantiles and quantile comparisons are standard mathematical techniques, and there exist variations as to how to concretely construct them.

It is noted that as the quantiles are based on the ON or OFF data subsets, these subsets contain the same number of observations.

Thus, the ON subsets are ordered after a value thereof, such as the power produced. The OFF subsets are ordered after the same value. Naturally, this may change the order of the subsets of the ON subsets compared to the order of the OFF subsets.

The procedure could choose a concrete quantile level (for example, the 20-quantiles are values that partition the dataset into 20 subsets of nearly equal sizes) on both ON and OFF data subsets, and compare them one to one. Their difference is the gain observed at that power level.

Different comparison methods exist. One is to simply compare the X quantiles of the ON and OFF sets, where the X quantile is the X-lowest value in the ON set and the OFF set. As described, these values do not necessarily relate to the same original pair. Multiple such comparisons may be made, such as the X quantile, the Y quantile, the Z quantile and the like. The X, Y and Z values are between 1 and the total number of pairs of ON/OFF data forming the data.

The values obtained in this way can further be interpolated, with the purpose of obtaining evenly spaced gain values.

An alternative approach (step 5*b*) of calculating the gain curve could comprise fitting a parametric curve shape to the observed data. Parametric curves and models are standard mathematical constructs: examples of which are the straight line, polynomial curves, the Weibull distribution, Beta distribution and many others. They all have in common the existence of a limited number of free parameters, which are selected in such a way that they optimize the fit to the observed data.

In one situation, a difference (delta-s) could be derived for each pair—the difference being the difference between the values of the data parts of the pair. The delta-s can e.g. be regarded as a function of the power level: each delta is in turn paired with the power level during the corresponding ON period, or the power level during the corresponding OFF period, or a combination of both the corresponding ON and OFF periods. Finally, these deltas and power levels are used to optimize the fit of the chosen parametric curve. This gives the gain curve.

From this curve, it may be determined whether the upgrade is suitable or not.

However, irrespective of how the gain curve is determined, the validation method could further comprise a procedure to assess an uncertainty of the results, such as by estimating uncertainty bands of the results.

Uncertainty bands are ranges of values around the obtained result or results that are believed to contain the true value or values with a high level of probability. The terms and the notions of Uncertainty Bands, Confidence Bands or Confidence Intervals are used interchangeably in this context.

Different approaches can be used to assess uncertainty bands. One approach relates to relying on large amounts of comparable historical data coming from other wind farms or other years where no toggling of the features has occurred, and to assess the natural variability of the results. This can be interpreted as the uncertainty band for the result.

Another approach relates to applying the so-called bootstrapping technique to the measured and filtered dataset. Bootstrapping is a standard procedure in mathematics and computer sciences. Essentially, it consists of taking a large number of random samples taken from the measured dataset (with replacement), and studying the variability that all these samples show. This variability is in turn interpreted as an uncertainty band for the actual measurement.

Yet another approach, which may be used when a plurality of wind turbines are analysed, relates to observing that each turbine in the park produces a gain curve, and treating the individual gain values of each individual turbine at each power level as a realizations of a same underlying statistical distribution. With this approach, it is possible to derive through standard statistical procedures, both the average gain per power production level across the turbines in the park, as well as the confidence interval of the measured gain at each power level based on the measured sample.

As an additional step, the gain values obtained at each power production level can be summed with the appropriate weights indicating the amount of hours that each power production level has witnessed: this results in an estimate of the total energy gain that the feature yields. As before, standard statistical procedures allow uncertainty bands to be estimated around the final total gain, based on the uncertainty bands at each power production level.

One simple manner of directly determining whether the upgrade is useful or not is to directly compare the cumulative energy production on the ON and the OFF periods.

Yet another manner of determining from the gain curve whether the upgrade is useful or not is to calculate (step 7), from the calculated gain curve the cumulative energy gain obtained during the validation campaign. This may be a single value or may be determined for a number of power production bands or intervals, for a number of wind directions, wind speeds, temperatures and the like, and then summed if desired. It may be desired to determine the gain assigned to each band multiplied by the number of hours that the actual production was within that band, either in the ON or in the OFF datasets.

Naturally, an uncertainty band may also be derived for that resulting value or those resulting values.

After the validation campaign is finished, and if the upgrade is found useful (step 8), part or all of the turbines in the park will typically then be configured to run with the feature ON continuously.

Actually, the above method also offers a way to estimate the gains derived from the upgrades in future years even if there is no OFF data available, by applying the same principle as in the previous paragraphs to the data collected in the future years.

The invention claimed is:

1. A method of estimating a parameter relating to an upgrade of a wind turbine software, the method comprising:
    toggling a wind turbine alternatingly between a first mode where the upgrade is not implemented and a second mode where the upgrade is implemented, wherein toggling the wind turbine alternating between the first mode and the second mode occurs at a frequency such that a wind speed experienced by the wind turbine during the first mode is the same as a wind speed experienced by the wind turbine during the second mode;
    during the first and second modes, collecting data relating to a performance of the wind turbine, wherein the data collected during the first, mode comprises a first number of data parts and the data collected during the second mode comprises a second number of data parts;
    discarding one or more data parts from the data collected during the first mode or the second mode such that the first number equals the second number:
    deriving pairs of data parts from remaining data parts from the data collected during the first mode and the data parts from the data collected during the second mode, where each pair of data parts comprises a first data part corresponding to the data collected during the first mode and during a first period of time and a second data part corresponding to the data collected during the second mode and during a second period of time;
    estimating the parameter from the pairs of data parts, wherein estimating the parameter comprises:
        ordering the first data parts in the pairs of data parts in increasing or decreasing order to produce first ordered data parts;
        ordering the second data parts in the pairs of data parts in increasing or decreasing order to produce second ordered data parts; and
        comparing a first data part at a first position in the first ordered data parts and a second data part at the first position in the second ordered data parts; and operating the wind turbine in the second mode if the estimated parameter indicates that the upgrade improved a power production of the wind turbine.

2. The method according to claim 1, wherein estimating the parameter further comprises comparing a third data part at a second position in the first ordered data parts and a fourth data part at the second position in the second ordered data parts.

3. The method according to claim 1, further comprising:
operating the wind turbine in the first mode while collecting the data,
deriving second pairs of data parts, where a first data part of a second pair corresponds to data collected during a third period of time and a second data part of the second pair corresponds to data collected during a fourth period of time,
ordering the first data parts of the second pairs in increasing or decreasing order, and
ordering the second data parts of the second pairs in increasing or decreasing order, wherein estimating the parameter further comprises comparing the data part of a first part of the second pairs at the first position in the ordered first parts of the second pairs and the data part of a second part of the second pairs at the first position in the ordered second parts of the second pairs.

4. A method of estimating a parameter relating to an upgrade of a wind turbine software, the method comprising:
toggling a wind turbine alternatingly between a first mode where the upgrade is not implemented and a second mode Where the upgrade is implemented, wherein toggling the wind turbine alternatingly between the first mode and the second mode occurs at a frequency such that a wind speed experienced by the wind turbine during the first mode is the same as a wind speed experienced by the wind turbine during the second mode;
during the first and second modes, collecting data relating to a performance of the wind turbine, wherein the data collected during the first mode comprises a first number of data parts and the data collected during the second mode comprises a second number of data parts;
discarding one or more data parts from the data collected during the first mode or the second mode such that the first number equals the second number;
deriving pairs of data parts from remaining data parts from the data collected during the first mode and the data, parts from the data collected during the second mode, where each pair of data parts comprises a first data part corresponding to the data collected during the first mode and during a first period of time and a second data part corresponding to the data collected during the second mode and during a second period of time;
estimating the parameter from the pairs of data, parts, wherein estimating the parameter comprises:
determining, for each pair of data parts, a difference value of a first data part and a second data part of that pair of data parts;
ordering the first data parts in the pairs of data parts in increasing or decreasing order to produce first ordered data parts;
ordering the second data parts in the pairs of data parts in increasing or decreasing order to produce second ordered data parts; and
fitting a curve to the difference values ordered according to the ordering of the first data parts and the second data parts; and operating the wind turbine in the second mode if the estimated parameter indicates that the upgrade improved a power production of the wind turbine.

5. The method according to claim 4, further comprising:
operating the wind turbine in the first mode while collecting data relating to a performance of the wind turbine,
deriving second pairs of data parts, where a first part of a second pair corresponds to the data collected during the first mode and derived during one period of time and a second part of the second pair corresponds to the data collected during the first mode and collected through a second period of time,
determining, for each second pair, a difference value of the first and second data parts of the second pair,
ordering the second pairs in accordance with a value determined from the first or second parts of the second pairs and
fitting a second curve to difference values ordered according to the of the second pairs, wherein estimating the parameter is based also on the second curve.

6. The method according to claim 4, wherein first and second periods of time of the data parts of each pair are adjacent to each other.

7. The method according to claim 4, wherein toggling between the first mode and the second mode occurs at least one time every hour.

8. The method according to claim 4, wherein the first and second periods of time are no more than three hours apart.

9. The method according to claim 4, wherein the collected data comprises a power production of the wind turbine.

10. A wind turbine comprising a controller configured to:
toggle the wind turbine alternatingly between a first mode where an upgrade is not implemented and a second mode Where the upgrade is implemented, wherein toggling the wind turbine alternatingly between the first mode and the second mode occurs at a frequency such that a wind speed experienced by the wind turbine during the first mode is the same as a wind speed experienced by the wind turbine during the second mode;
during the first and second modes, collect data relating to a performance of the wind turbine, wherein the data collected during the first mode comprises a first number of data parts and the data collected during the second mode, comprises a second number of data parts;
discard one or more data parts from the data collected during the first mode or the second mode such that the first number equals the second number;
derive pairs of data parts from remaining data parts from the data collected during the first mode and the data parts from the data collected during the second mode where each pair of data parts comprises a first data part corresponding to the data collected during a first period of time and a second data part corresponding to the data, collected during a second period of time:
estimate a parameter from the pairs of data parts, wherein estimating the parameter comprises:
ordering the first data parts in the pairs of data parts in increasing or decreasing order to produce first ordered data parts;
ordering the second data parts in the pairs of data parts in increasing or decreasing order to produce second ordered data parts; and comparing a first data part at a first position in the first ordered data parts and a second data part at the first position in the second ordered data parts; and operating the wind turbine in the second mode if the estimated parameter indicates that the upgrade improved a power production of the wind turbine.

11. A wind turbine comprising a controller configured to:

toggle the wind turbine alternatingly between a first mode where an upgrade is not implemented and a second mode where the upgrade is implemented, wherein toggling the wind turbine alternatingly between the first mode and the second mode occurs at a frequency such that a wind speed experienced by the wind turbine during the first mode is the same as a wind speed experienced by the wind turbine during the second mode;

during the first and second modes, collect data relating to a performance of the wind turbine, wherein the data collected during the first mode comprises a first number of data parts and the data collected during the second mode comprises a second number of data parts;

discard one or more data parts from the data collected during the first mode or the second mode such that the first number equals the second number;

derive pairs of data parts from remaining data parts from the data collected during the first mode and the data parts from the data collected during the second mode, where each pair of data parts comprises a first data part corresponding to the data collected during the first mode and during a first period of time and a second data part corresponding to the data collected during the second mode and during a second period of time;

estimate a parameter from the pairs of data parts, wherein estimating the parameter comprises:

determining, for each pair of data parts, a difference value of a first data part and a second data part of that pair of data parts;

ordering the first data parts in the pairs of data parts in increasing or decreasing order to produce first ordered data parts; ordering the second data parts in the pairs of data pasts in increasing or decreasing order to produce second ordered data parts; and fitting a curve to the difference values ordered according to the ordering of the first data parts and the second data parts; and operate the wind turbine in the second mode if the estimated parameter indicates that the upgrade improved a power production of the wind turbine.

12. The wind turbine according to claim 10, wherein first and second periods of time of the data parts of each pair are adjacent to each other.

13. The wind turbine according to claim 10, wherein toggling between the first mode and the second mode occurs at least one time every hour.

14. A non-transitory computer readable medium comprising a set of instructions which, when executed by a controller of a wind turbine, cause the controller to:

toggle the wind turbine alternatingly between a first mode where an upgrade is not implemented and a second mode where the upgrade is implemented, wherein toggling the wind turbine alternatingly between the first mode and the second mode occurs at a frequency such that a wind speed experienced by the wind to during the first mode is the same as a wind speed experienced by the wind turbine during the second mode;

during the first and second modes, collect data relating to a performance of the wind turbine, wherein the data collected during the first mode comprises a first number of data parts and the data collected during the second mode comprises a second number of data, parts;

discard one or more data parts from the data collected during the first mode or the second mode such that the first number equals the second number;

derive pairs of data parts from remaining data parts from the data collected during the first mode and the data parts from the data collected during the second mode, where each pair of data parts comprises a first data part corresponding to the data collected during a first period of time and a second data part corresponding to the data collected during a second period of time;

estimate a parameter from the pairs of data parts, wherein estimating the parameter comprises:

ordering the first data parts in the pairs of data parts in increasing or decreasing order to produce first ordered data parts;

ordering the second data parts in the pairs of data parts in increasing or decreasing order to produce second ordered data parts; and comparing a first data part at a first position in the first ordered data parts and a second part at the first position in the second ordered data parts;

and operate the wind turbine in the second mode if the estimated parameter indicates that the upgrade improved a power production of the wind turbine.

15. The non-transitory computer readable medium according to claim 14, wherein estimating the parameter further comprises comparing a third at a second position in the ordered first parts and a fourth data part at the second position in the ordered second parts.

16. The non-transitory computer readable medium according to claim 14, wherein the instructions, when executed by the controller, further cause the controller to:

operate the wind turbine in the first mode while collecting the data;

derive second pairs of data parts, where a first data part of a second pair corresponds to data collected during a third period of time and a second data part of the second pair corresponds to data collected during a fourth period of time;

order the first parts of the second pairs in increasing or decreasing order; and order the second parts of the second pairs in increasing or decreasing order, wherein estimating the parameter further comprises comparing the data part of a first part of the second pairs at the first position in the ordered first parts of the second pairs and the data part of a second part of the second pairs at the first position in the ordered second parts of the second pairs.

17. The method according to claim 1, wherein the first and second periods of time are adjacent to each other.

18. The method according to claim 1, wherein toggling between the first mode and the second mode occurs at least one time every hour.

19. The method according to claim 1, wherein the first and second periods of time are no more than three hours apart.

* * * * *